United States Patent
Russo

(10) Patent No.: US 12,380,514 B2
(45) Date of Patent: *Aug. 5, 2025

(54) SYSTEMS AND METHODS FOR MODELING DISEASE SEVERITY

(71) Applicant: BASF CORPORATION, Florham Park, NJ (US)

(72) Inventor: Joseph Martin Russo, Bellefonte, PA (US)

(73) Assignee: BASF Corporation, Florham Park, NJ (US)

(*) Notice: Subject to any disclaimer, the term of this patent is extended or adjusted under 35 U.S.C. 154(b) by 33 days.

This patent is subject to a terminal disclaimer.

(21) Appl. No.: 17/786,421

(22) PCT Filed: Dec. 18, 2020

(86) PCT No.: PCT/US2020/065850
§ 371 (c)(1),
(2) Date: Jun. 16, 2022

(87) PCT Pub. No.: WO2021/127336
PCT Pub. Date: Jun. 24, 2021

(65) Prior Publication Data
US 2023/0012721 A1    Jan. 19, 2023

Related U.S. Application Data

(63) Continuation-in-part of application No. 16/720,713, filed on Dec. 19, 2019, now Pat. No. 11,555,946.

(51) Int. Cl.
*G06Q 50/02* (2024.01)
*G01W 1/06* (2006.01)
*G16Z 99/00* (2019.01)

(52) U.S. Cl.
CPC .............. *G06Q 50/02* (2013.01); *G01W 1/06* (2013.01); *G16Z 99/00* (2019.02)

(58) Field of Classification Search
CPC ......... G06Q 50/02; G16Z 99/00; G01W 1/06; G01W 1/10; G01W 1/12; G01W 1/14; A01B 79/005
See application file for complete search history.

(56) References Cited

U.S. PATENT DOCUMENTS 5,334,942 A * 8/1994 Hulse ................... G01N 27/048
324/692
2009/0277081 A1* 11/2009 Georges ............. A01G 13/0243
47/20.1

(Continued)

FOREIGN PATENT DOCUMENTS

CN      106754567 A      5/2017
KR      20180015325 A  *  2/2018

OTHER PUBLICATIONS

Simone Bregaglio et al./ Agricultural and forest Meterology (2011) 1163-1172 (Year: 2011).*

(Continued)

*Primary Examiner* — Manish S Shah
*Assistant Examiner* — Sharad Timilsina
(74) *Attorney, Agent, or Firm* — ArentFox Schiff LLP

(57) ABSTRACT

Example embodiments provide systems and methods for simulating a disease outbreak based on a limited number of input parameters. In one embodiment, a disease severity level is computed based on a relationship between leaf wetness duration and average temperature during a wetness period. The resulting model can be a physical, deterministic model that accepts hourly weather data as input and outputs the most significant severity event of disease infection during a specified period.

20 Claims, 9 Drawing Sheets

(56) References Cited

U.S. PATENT DOCUMENTS

| | | | |
|---|---|---|---|
| 2012/0123817 A1 | 5/2012 | Hohenberger et al. | |
| 2014/0077969 A1* | 3/2014 | Vian | G08B 13/00 |
| | | | 340/870.02 |
| 2017/0364816 A1* | 12/2017 | Marticorena | G06N 5/048 |
| 2018/0262571 A1 | 9/2018 | Akhtar | |

OTHER PUBLICATIONS

Simone Bregaglio et al. / Agricultural and forest Meterology 151 (Year: 2011).*

International Search Report and Written Opinion of International Application No. PCT/US2020/065850 mailed Apr. 12, 2021, 10 pgs.

Bregaglio et al., "Multi metric evaluation of leaf wetness models for large-area application of plant disease models," Agricultural and Forest Meteorology, Apr. 10, 2011, pp. 1163-1172, vol. 151, No. 9., Elsevier, Amsterdam, NL.

Jacobs et al., "Simulating of leaf wetness duration within a potato canopy," NJAS—Wageningen Journal of Life Sciences, Jan. 1, 2005, pp. 151-166, vol. 53, No. 2, Elsevier, Amsterdam, NL.

Streit, et al., "Modelling the combined effect of moisture and temperature on secondary infection in a coupled host-pathogen FSPM," 2018 6th International Symposium on Plant Growth Modeling, Simulation, Visualization and Aplications (PMA), EEE, Nov. 4, 2018, pp. 1-8.

Streit et al., "Modelling the combined effect of moisture and temperature on secondary infection in a coupled host- pathogen FSPM," 2018 6th International Symposium on Plant Growth Modeling, Simulation, Visualization and Applications (PMA), pp. 1-8.

Meirelles et al., "Data mining in the reduction of the number of places of experiments for plant cultivates," Computers and Electronics in Agriculture, vol. 113, Apr. 2015, pp. 136-147.

Webber et al., "Simulating canopy temperature for modelling heat stress in cereals," Environmental Modelling & Software, vol. 77, Mar. 2016, pp. 143-155.

* cited by examiner

SYSTEMS AND METHODS FOR MODELING DISEASE SEVERITY

CROSS REFERENCE TO RELATED APPLICATION(S)

This application is a national stage entry under 35 U.S.C. § 371 of International Application No. PCT/US2020/065850, filed on Dec. 18, 2020, which claims the benefit of priority of U.S. Non-Provisional patent application Ser. No. 16/720,713, filed on Dec. 19, 2019, the disclosures of which are hereby incorporated by reference herein in their entireties.

FIELD OF THE INVENTION

The present application relates to computational techniques for predicting, detecting, and modeling diseases in plants and animals.

BACKGROUND

In agriculture it is desirable to maximize, as much as possible, the production or yield of a given agricultural product. One factor that limits the amount of production or yield are diseases, which can include (for example) microorganisms, insects, bacteria, fungi, viruses, infectious agents, parasites, and genetic disorders. A disease outbreak can reduce or even outright destroy a harvest.

In many cases, agricultural diseases can be treated or controlled—for example, by spraying a crop with an appropriate treatment such as a fungicide, insecticide, or pesticide. However, these treatments are expensive and time-consuming to apply. Accordingly, they should be applied only where and when they can be most effective. In order to effectively target disease treatments, it is critical to understand (and, if possible, to predict) the risk of a disease outbreak at a given time and place.

A number of techniques exist for simulating a disease outbreak. Typically, these simulations attempt to model an exact relationship between a particular type of disease and a particular host. Accordingly, different simulations are needed to model the various diseases that could affect a single type of crop; if multiple crop types must be considered, the number of simulations increases proportionally. Furthermore, each individual simulation tends to be computationally intensive, because a large number of variables and parameters must be accounted for in order to model an exact relationship between a disease and a host. Thus, existing simulation methods require a significant amount of time in order to evaluate the risk to a given agricultural product, which reduces the time available to respond to a predicted outbreak.

Moreover, a great deal of research and work needs to be done to determine the relationship between a given disease and a particular host. This makes it difficult to expand a simulation to new disease types.

SUMMARY

According to a first embodiment, a method for predicting, detecting, and modeling diseases in plants and animals is provided. A computing device may receive an input comprising weather data for a given day. The computing device may conduct a simulation using a disease severity model at predefined time intervals for a given day that uses air temperature and leaf wetness duration as input. The leaf wetness duration is derived from a canopy moisture budget and is defined as a continuous period when a leaf canopy is wet. The air temperature may be averaged during a leaf wetness duration at predefined time intervals during that period. The computing device may compute a disease severity level based on the leaf wetness duration and the average air temperature. The computing device may generate an output comprising the disease severity level for the given day.

A second embodiment incorporates the method of the first embodiment, and further comprises determining one or more of a precipitation amount, a dew amount, or a leaf surface evaporation amount, wherein precipitation and dew add to the canopy moisture budget and leaf surface evaporation subtracts from it.

A third embodiment incorporates the method of the second embodiment, where the weather data describes the precipitation amount, a relative humidity, a wind speed, and an amount of incoming solar radiation, the dew amount is increased when the relative humidity exceeds a predetermined threshold, and the leaf surface evaporation is a function of the relative humidity, the wind speed, and the incoming solar radiation.

A fourth embodiment incorporates the method of any of the preceding embodiments, and further determines that the disease severity level increases when the average air temperature falls within a predetermined range during the leaf wetness duration.

A fifth embodiment incorporates the method of any of the preceding embodiments, and further computes the disease severity level by determining a minimum number of wetness hours for infection, determining whether the leaf wetness duration exceeds the minimum number of wetness hours, and determining the disease severity level based on the leaf wetness duration exceeding the minimum number of wetness hours at a favorable air temperature.

A sixth embodiment incorporates the method of any of the preceding embodiments, and further defines the disease severity level based on a length of the leaf wetness duration.

A seventh embodiment incorporates the method of any of the preceding embodiments, and further computes the disease severity level based on the number and severity of disease events that occur in a given day. If a single disease event occurs in the given day, the disease severity level is set to a severity of the single disease event. If a plurality of disease events having different severities occur in a given day, the disease severity level is set to a severity of the most-severe event.

According to an eight embodiment, a non-transitory computer-readable medium stores instructions for performing the techniques described above with reference to any or all of the first to seventh embodiments.

According to a ninth embodiment, an apparatus is provided for performing the techniques described above with reference to any or all of the first to seventh embodiments.

DETAILED DESCRIPTION

Figure 1:
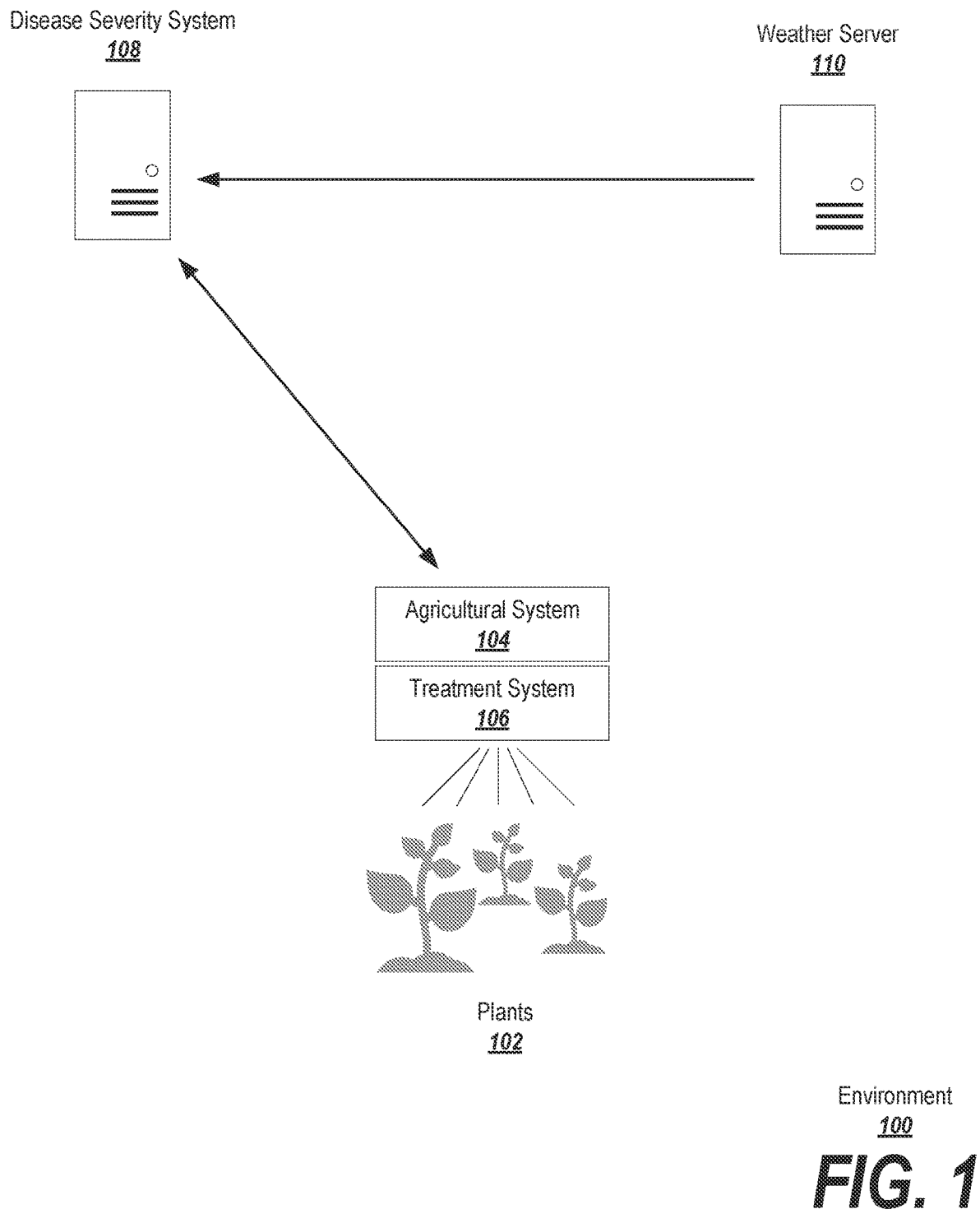
FIG. 1 depicts an environment suitable for use with exemplary embodiments.

Exemplary embodiments provide techniques for simulating a disease outbreak using a relatively simple formula based on a limited number of input parameters. In particular, disease severity is computed based on a relationship between leaf wetness duration and average temperature during a wetness period. The model operates on input received in predefined increments (e.g., one hour) and calculates a disease severity level for that increment. The resulting model is a physical, deterministic model that accepts weather data in predefined increments as input and outputs the most significant severity event of disease infection during a specified (e.g., one-day) period. It can be applied to many different species of plants and animals with minor changes in a few coefficients that can be determined based on genetic information without the need to perform extensive experiments or significantly modify the model.

The disease severity model first calculates leaf wetness duration using a canopy moisture budget. Precipitation and dew contribute to the budget, while leaf surface evaporation subtracts from it. Dew formation is assumed to occur when relative humidity exceeds a predetermined threshold. Leaf surface evaporation is a function of relative humidity, wind speed and incoming solar radiation. Low humidity, fast wind speed, and high solar radiation accelerate leaf evaporation.

During each increment of a disease severity model simulation, the canopy moisture budget is adjusted for the addition of precipitation and dew and the subtraction of leaf surface evaporation. If, in a given increment, the canopy moisture budget is greater than 0 (e.g., as measured in mm), leaves are assumed wet adding one increment to the wetness duration. The duration increases by one increment for each successive increment the budget is greater than 0. The leaf wetness duration ends on the increment the canopy moisture budget equals 0.

The disease severity model next calculates the average air temperature during a period of leaf wetness. A disease severity event is assumed to occur when the wetness duration exceeds a predetermined number of hours and the average air temperature for the period of wetness is in a favorable range of values. The range of favorable temperatures is defined by upper and lower thresholds. An infection cannot develop if air temperatures are either below or above these thresholds regardless if a canopy is wet. If air temperatures are favorable, the intensity of a disease severity event is defined by the length of a wetness duration period.

Next, the disease severity model calculates the degree of infection (level of severity) based on the leaf wetness duration and average air temperature during a wetness period. A relationship between leaf wetness duration and favorable air temperatures determines the minimum number of wetness hours for infection. In one embodiment, the relationship is given as shown below in Equation 1:

$$\text{wetness hours} = a\left(e^{\frac{temp-b}{c}} + e^{\frac{b-temp}{c}}\right) \quad \text{Eq. 1}$$

where temp specifies the average air temperature during the wetness period, wetness hours are the minimum number of leaf canopy wetness hours for infection, and a, b, and c are coefficients that are determined by the plant or animal species (or a subset of a plant or animal, such as a particular organ or system) and the disease in question. The coefficients may be determined from lab or field data, or from an analysis of a phylogenetic tree. Species that share common traits or genetic similarities may be associated with similar a, b, and c coefficients. Coefficient a represents one half of the minimum hours for an infection at the optimum temperature. Coefficient b is the optimum temperature for infection. Coefficient c is a scalar that adjusts the minimum number of wetness hours for an infection relative to a given temperature (e.g., increasing values of c, decrease the required minimum wetness hours at a given temperature).

The relationship may also be used to determine the degree of infection or severity level with increasing wetness hours at favorable air temperatures. The number of wetness hours after the start of an infection may be normalized to a scale ranging from 0 to 100%. A severity level of 0% indicates no infection, while 100% indicates severe infection, with predefined degrees of infection between these extreme limits.

If only a single disease severity event occurs in a day, the daily severity level is set to the value of that event. However, it is possible for multiple severity events to occur within a day. In this case, the daily level is set to the event having the greatest severity. Daily severity levels, ranging from 0 to 100%, are delivered as model output.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. The description of embodiments should facilitate understanding of the invention to such an extent that other implementations, not specifically covered but within the knowledge of a person of skill in the art having read the description of embodiments, would be understood to be consistent with an application of the invention.

It is noted that, although exemplary embodiments are described in connection with particular examples (the amount of hours that leaves of certain plants must be wet in order for a disease event to occur), the present invention is not limited to these examples.

FIG. 1 illustrates a diagnosis, prediction, and treatment environment 100 according to an example embodiment.

The environment 100 includes one or more species of plants 102 that may be subject to one or more diseases. Although the exemplary embodiment is illustrated with plants, the principles described herein may be used with different types of disease hosts, including animals, organs (e.g., a heart, liver, lungs), systems (e.g., a respiratory system, a nervous system, etc.). In some embodiments, relatively simple equations such as the one described in Equation 1 may be used to model the effect of a given disease on a given organism, and then these disease severities may be combined to determine the effects of different diseases on the organism and on systems made up of multiple organisms.

The term "disease," as used herein, refers to any vector tending to cause disorder in the structure or function of the organism being affected by the disease. This may include bacterial infections, viral infections, fungal infections, outbreaks associated with insects or other organisms, or any other condition that impairs normal functioning that is not directly related to physical injury. In some embodiments, specific diseases may relate to fungal infections and outbreaks associated with insects. The term "insect" should also be understood to include arachnids, nematodes, and molluscs.

The terms "disease severity" and "disease severity level," as used herein, for example, when described in connection with a disease severity model, can refer to any of the following: (1) a probability of incidence of a specific disease on a specific crop/plant under given weather or environmental circumstances, indicated in a percentage (e.g., a disease risk); (2) a percentage of foliage (or leaf) area infected/impacted by a specific disease; or (3) a vertical extent of an infection of a specific disease on a plant. A disease severity level can be 0% for a specific disease or greater than zero for specific diseases (e.g., Fusarium disease on wheat at 10% severity, Fusarium disease on corn at 20%, etc.). For vertical extent of a disease severity, disease severity may depend on which portions of a plant are infected (e.g., case 1: top and bottom layers of the plant are infected, resulting in a high disease severity level; case 2: only a bottom layer of the plant is infected, resulting in a low disease severity level). In one preferred embodiment, "disease severity" and "disease severity level" refer to the probability of incidence of a specific disease on a specific crop/plant under given weather or environmental circumstances, indicated in a percentage (e.g., a disease risk). In another preferred embodiment, "disease severity" and "disease severity level" refer to a percentage of foliage (or leaf) area infected/impacted by a specific disease. In another preferred embodiment, "disease severity" and "disease severity level" refer to a vertical extent of an infection of a specific disease on a plant.

Certain procedures relating to the plants 102 may be overseen or regulated by an agricultural system 104. The agricultural system 104 may be a computer or server located at an agricultural facility, and may be tasked with monitoring and/or controlling irrigation procedures, fertilizer application, etc.

One such task may be treating the plants 102 to prevent, mitigate, or control disease outbreaks. To this end, the agricultural system 104 may interface with a treatment system 106, which may control the application of one or more disease treatments. For instance, a given disease may be treatable by spraying the plants 102 with a topical treatment, and the treatment system 106 may control a spraying device that applies a given amount of the treatment to the plants 102.

The treatment system 106 may select the type of treatment to be applied, the amount of the treatment, and other treatment parameters based on the disease severity level associated with the treatment type as determined by a disease severity system 108. The disease severity system 108 may be a separate computing device, such as a server or remotely-operating computing system, or may be co-located with, or integral with, the agricultural system 104 and/or the treatment system 106.

The disease severity system 108 may determine the severity level of a disease outbreak based on weather information provided to the disease severity system 108 by a weather server 110. The weather server 110 may be a third-party server that provides weather data to subscribing users, or may be operated by the same entity that operates the disease severity system 108, the agricultural system 104, and/or the treatment system 106.

Figure 2:
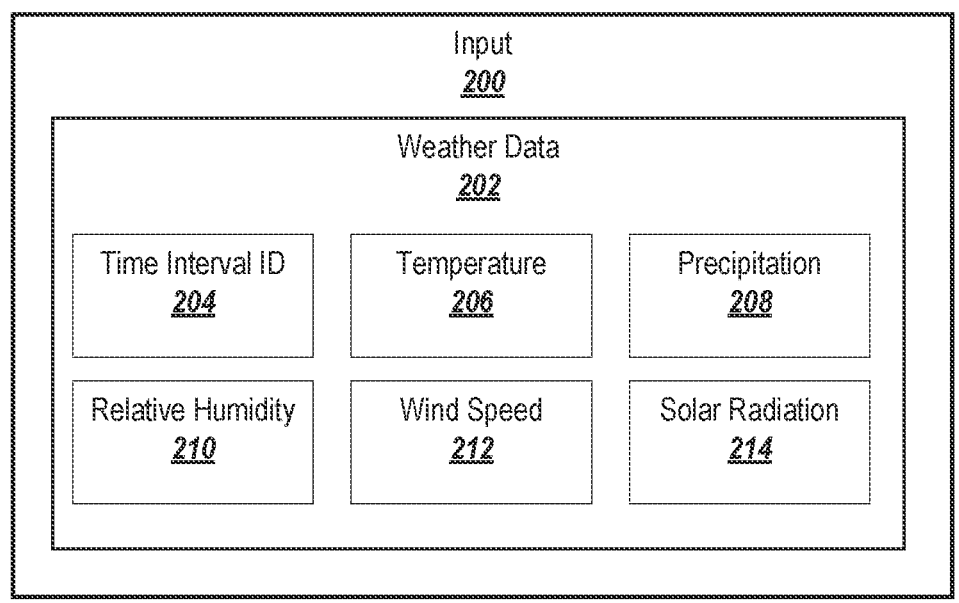
FIG. 2 depicts an exemplary data structure suitable for use with an exemplary disease severity model.

The weather information provided from the weather server 110 to the disease severity system 108 may be represented as an input to the disease severity system 108. FIG. 2 depicts an example of a data structure representing an input 200. Although the exemplary input 200 includes specific variables in a particular order, one of ordinary skill in the art will recognize that more, fewer, or different variables may be used, depending on the application. If a value is not specified for a variable, a default value may be used (e.g., a predefined minimum value, an average value, etc.). Values for the variables may be represented qualitatively, quantitatively, or both.

Values may be specified as a minimum or maximum value, a range of acceptable values, etc. The values may be associated with a weight or priority, indicating how important a particular performance characteristic is relative to other performance characteristics. The weight or priority may be zero, indicating that the performance characteristic is inconsequential or should not be prioritized.

The input 200 may include weather data 202 describing the actual or predicted weather over a certain time interval. Accordingly, the weather data 202 may include an identifier 204 that designates or describes the time interval in question. For instance, the time interval ID 204 may give a time and/or date range for the time interval, or a timestamp indicating a starting or ending time for the time interval. The time interval ID 204 may optionally include a length of the time interval, or this information may optionally be stored elsewhere or known a priori.

The weather data 202 may include various measurements, parameters, or predictions for the weather during the time interval. This may include, for instance, the temperature 206, the amount of precipitation 208, the relative humidity 210, the wind speed 212 and/or direction, and a measurement of the level of solar radiation 214. These measurements, parameters, or predictions may be a single value (e.g., an average value over the time interval), or multiple values throughout the interval, which may be averaged by the disease severity system 108 before use. The measurements, parameters, or predictions may be values for the elements specified, and/or may include values for other elements from which values for the specified elements may be derived.

Figure 3:
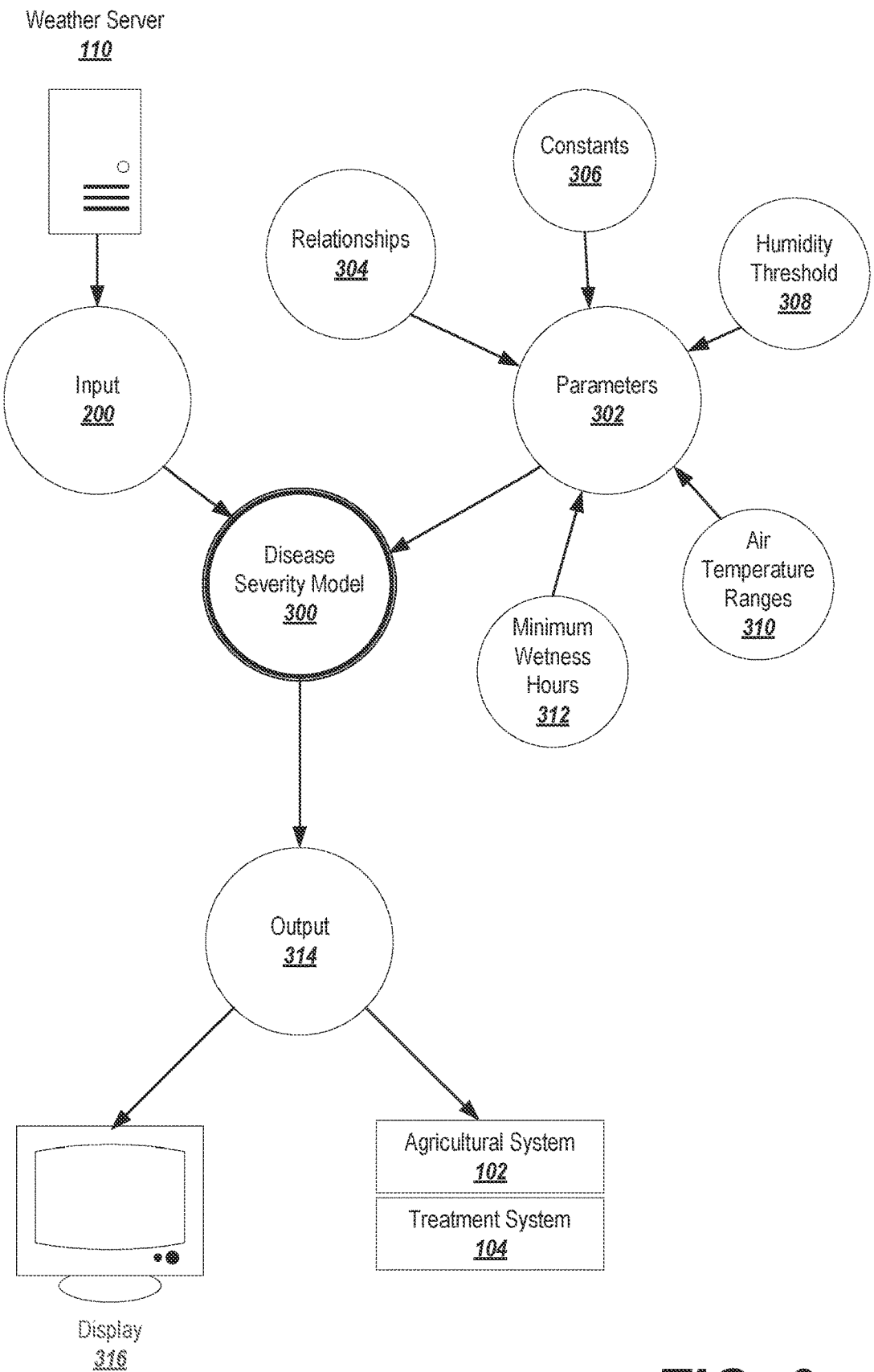
FIG. 3 is an exemplary input/output specification depicting inputs to the optimization logic, and corresponding outputs generated by the optimization logic.

As shown in the input/output specification of FIG. 3, the input 200 may be provided from the weather server 110 to a disease severity model 300 running on the disease severity system 108.

The disease severity model 300 may further make use of various parameters 302. These parameters 302 may include, for example, one or more relationships 304, such as the relationship given by Equation 1 above (relating the average temperature over a time interval to the minimum required wetness in order for a disease event to occur).

One or more of the relationships 304 may make use of constants 306, which may allow a given relationship to be used for different types of plant/animal species and different types of diseases. By substituting one set of constants 306 for another, a different disease can be simulated in a given organism, the same disease can be simulated in different organisms, or different diseases can be simulated in different organisms. The constants 306 may be derived from experimental laboratory or field data, simulation, or based on similarities and/or differences in two species' phylogenetic trees.

Figure 4:
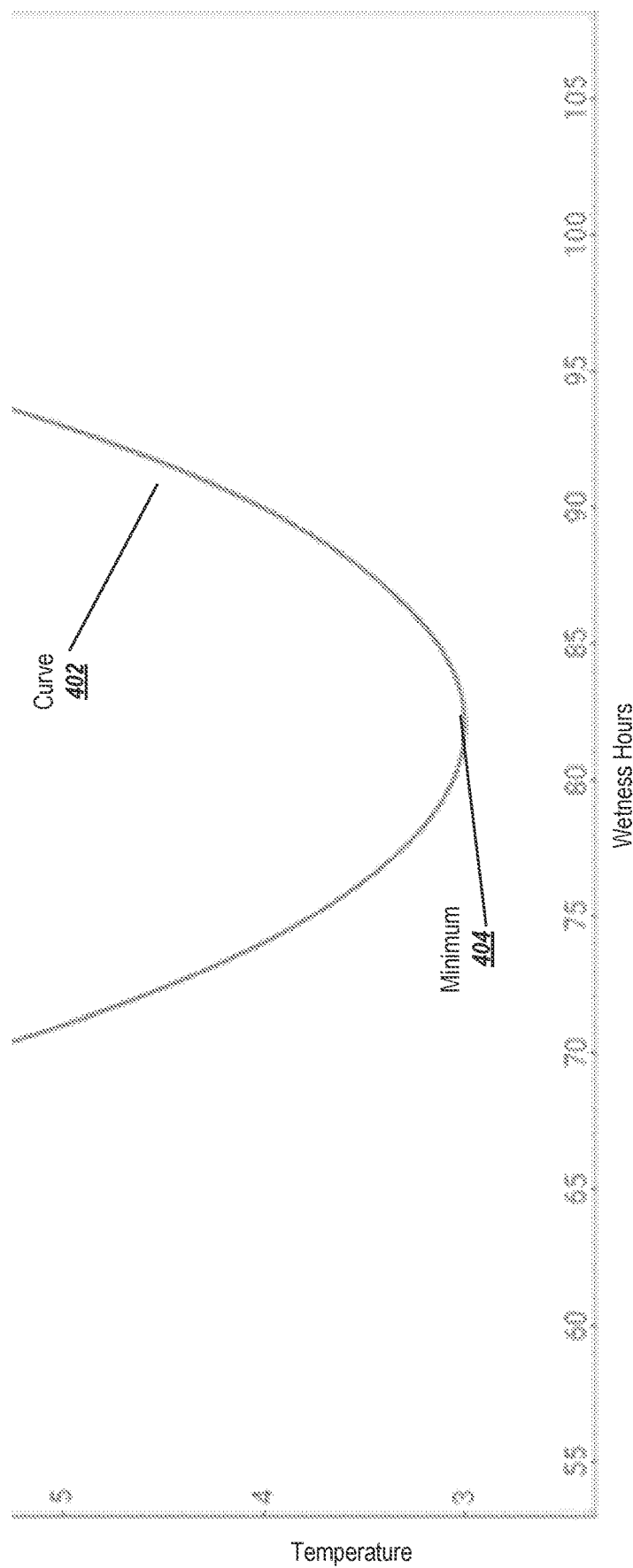
FIG. 4 depicts an exemplary relationship between temperature and minimum leaf wetness values according to one embodiment.

By way of example, Equation 1 may be applied to evaluate the minimum number of wetness hours for grey leaf spots to develop on turf. By setting the values of the constants to a=1.5, b=82, c=10, the curve as shown in FIG. 4 is produced. The values of the points on the curve 402 represent the number of hours that the leaf canopy must be wet in order for the disease to have an effect at various temperatures. The minimum number of wetness hours occurs at the minimal point 404 on the curve 402. In this case, the minimum is 3 hours, which occurs at approximately 82° F. This relationship can also be used to derive the minimum wetness hours at other temperatures; for example, the graph shows a minimum number of wetness hours of about 3.25 at 78° F., or 3.6 at 88° F. As discussed in more detail below, disease formation may be limited to a certain band of temperatures, which may define the range through which disease development can occur.

Returning to FIG. 3, the relationships 304 may include other relationships as well. For example, a relationship between precipitation (as derived from the weather data 202) and dew to leaf canopy moisture may specified. In order to determine the level of dew, the parameters 302 may include a humidity threshold 308, which defines the minimum relative humidity at which dew occurs; any amount relative humidity over this threshold amount may contribute to dew formation.

The relationships 304 may also include a relationship between relative humidity, wind speed, and incoming solar radiation (as derived from the weather data 202) and leaf surface evaporation. All else being equal, low humidity, fast wind speed, and high solar radiation each accelerate leaf evaporation.

Yet another relationship 304 may describe how precipitation, dew, and evaporation adjust the level of canopy moisture (referred to as the canopy moisture budget). In this relationship, precipitation and dew add to the canopy moisture budget, while evaporation subtracts from it.

The parameters 302 may include air temperature ranges 310, which represent the range of air temperatures in which disease development is favorable. In some embodiments, a disease event is considered to occur when the canopy moisture budget exceeds 0 for more than a predefined minimum number of wetness hours 312 (or some other interval), and the average air temperature during the prospective disease event is within the air temperate range 310. The air temperature range may include a minimum value and a maximum value (representing a temperature below which, or above which, the given disease tends to be repressed).

The parameters 302 may include other values, such as threshold levels for different disease severities, normalization factors allowing the severity level to be scaled (e.g., on a percentage basis), etc.

Based on the input 200 and the parameters 302, the disease severity model 300 may determine whether a disease event occurs in a given time interval, a length of the severity event, and a level of the severity event. If multiple severity events occur in a given day or some other time period), a severity level for the day may be generated as well. The severity level for the day may be set to the severity level of the most-severe event for the day, or may be set to the average severity level for that day, among other possibilities. Once this information is determined, it may be stored in an output 314 data structure, which may be displayed on an interface of a display 316 and/or transmitted to an agricultural system 104 for use by a treatment system 106.

Figure 5:
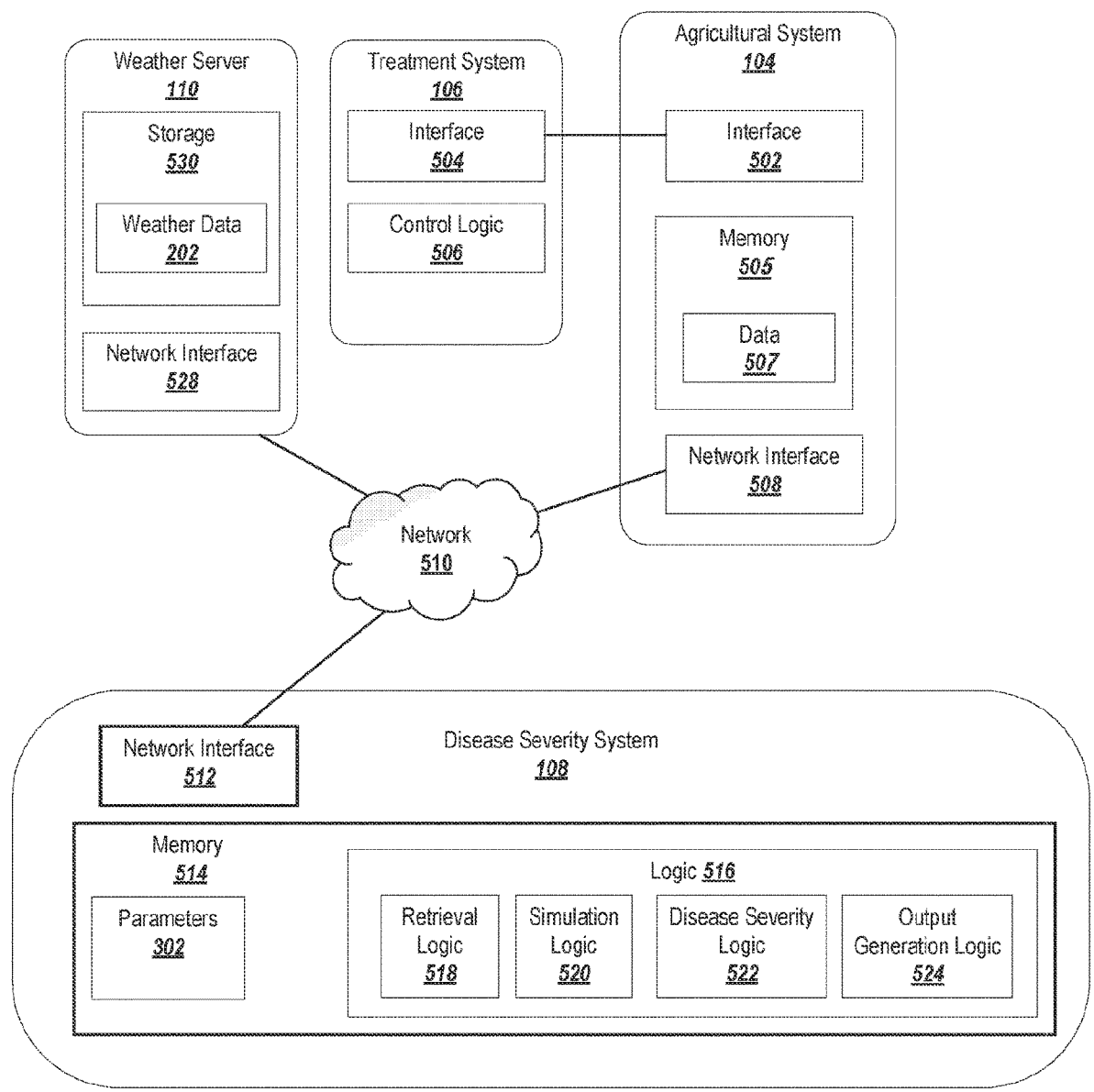
FIG. 5 is a block diagram depicting various components of devices in the environment of FIG. 1, according to an exemplary embodiment.

As shown in FIG. 5, the disease severity model 300 may be embodied in disease severity logic 522 stored in a memory 514 on the disease severity system 108. The parameters 302 may likewise be stored in the memory 514 of the disease severity system 108. These and other components of the environment 100 are depicted in more detail in the block diagram of FIG. 5.

In order to retrieve input weather data, the disease severity system 108 may interface with the weather server 110 via corresponding network interfaces 512, 528. The weather server 110 may store weather data 202 in a storage device 530, which may be a non-transitory computer-readable storage medium (e.g., an HDD, SDD, RAM, ROM, etc.). The weather data 202 may be provided to the network interface 528 for transmission over the network 510 to the network interface 512 of the disease severity system 108.

The disease severity system 108 may receive the weather data 202 over the network interface 512, and may use the weather data, in conjunction with parameters 302 (see FIG. 3) stored in a memory 514. The memory 514 may be a non-transitory computer-readable storage medium (e.g., an HDD, SDD, RAM, ROM, etc.). The memory 514 may further store logic 516 configured to use the weather data 202 and the parameters 302 to determine when disease events occur, the severity level of the event, and/or a daily severity level. The logic 516 may correspond to the logic blocks depicted in FIG. 6A (e.g., the retrieval logic 518 may perform the actions described in connection with blocks 606-608; the simulation logic 520 may correspond to blocks 610-616; and the disease severity logic 522 may correspond to blocks 618-624). The output generation logic 524 may generate an output as suitable for use or display by an appropriate output device (see FIG. 3). For example, the output may include the daily severity level, the number of disease events, the severity level and/or length of each severity event, the organisms affected, the diseases in effect, etc.

The output may be transmitted to the agricultural system 104 and may be received at the network interface 508. The agricultural system 104 may store the output as data 507 in a memory 505, which may be a non-transitory computer-readable storage medium (e.g., an HDD, SDD, RAM, ROM, etc.). Based on the results obtained by the disease severity system, the agricultural system may determine whether to take corrective action. For example, if the disease severity level for a given day exceeds a threshold level, the agricultural system may interface with the treatment system 106 via corresponding interfaces 502, 504. If the treatment system 106 receives an instruction to apply a treatment for the disease, then the treatment system may operate control logic 506 which may control a treatment application device that causes the treatment to be applied. Alternatively or in addition, the agricultural system 104 may send alerts or notifications to one or more registered users, who can then control application of the treatment.

These actions are described in more detail in connection with the flowchart shown in FIG. 6A. The blocks of FIG. 6A may be implemented as logic 600 or instructions stored on a non-transitory computer-readable medium for execution at, for example, the disease severity system 108, the agricultural system 104, the treatment system 106, and/or the weather server 110.

Figure 6A:
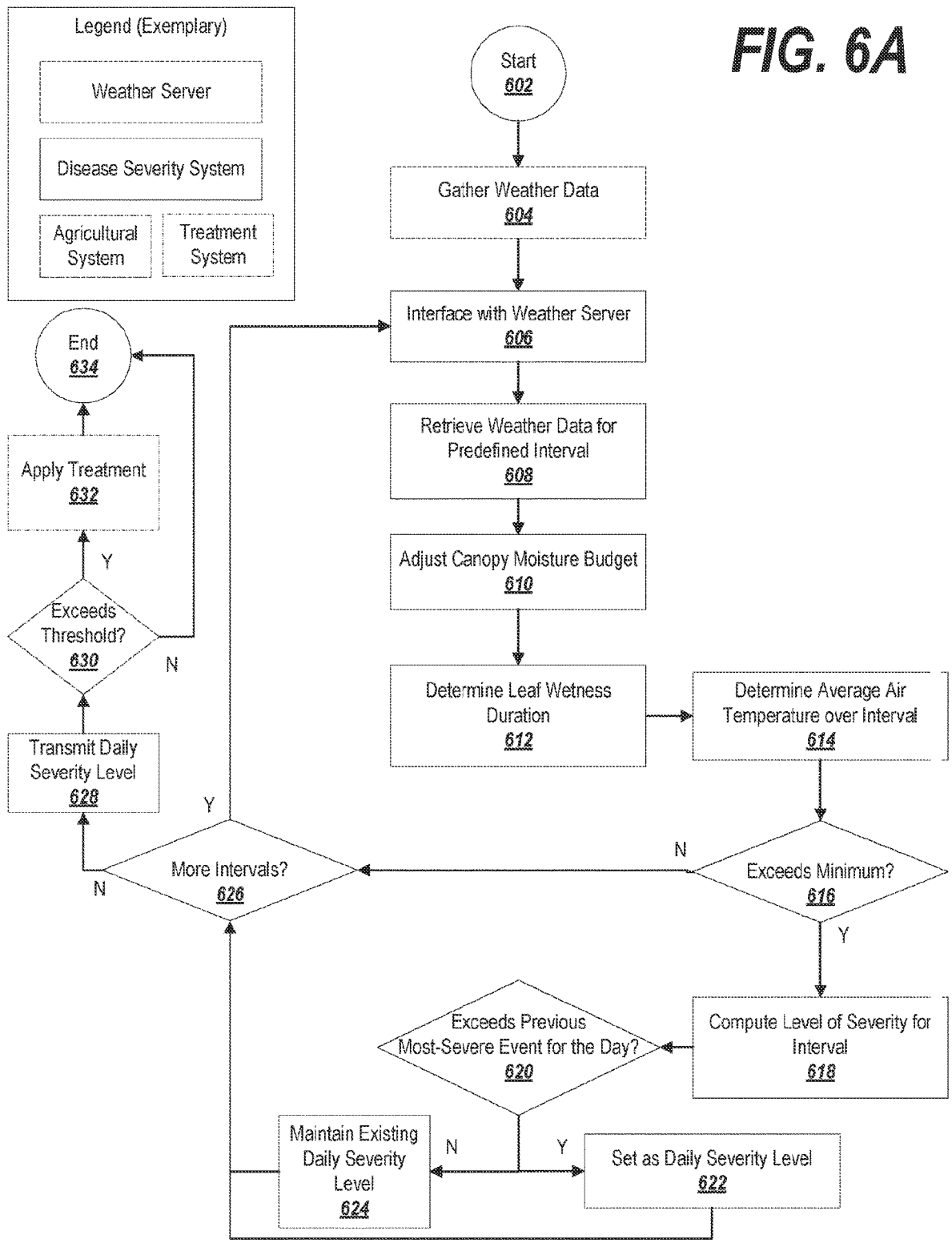
FIG. 6A is a flowchart illustrating key operations according to an example embodiment.

Although FIG. 6A provides an example in which particular blocks are executed on particular devices, it is understood that the present invention is not limited to this particular configuration. Some blocks may be combined into other blocks or omitted, some devices may be combined together, and some individual blocks may be distributed among different devices. In some embodiments, blocks depicted as being performed at one device may instead be performed at a different device, depending on the particular application (e.g., for efficiency, reduced latency, improved power usage, better processing power, memory constraints, etc.).

Processing may start at block 602. At block 604, the weather server may gather weather data. The weather data may be gathered from sensors, manual input by users, or other techniques. The weather data may be gathered from other sources and then aggregated at the weather server, or may be received at the disease severity system (blocks 606-608) from multiple weather servers.

At block 606, the disease severity system may interface with the weather server (e.g., through a direct connection, via a network, etc.). Using the connection established in block 606, the disease severity system may retrieve the weather data for a predefined interval at block 608. The interval may be a current interval (e.g., the current hours' worth of data), a past interval (e.g., as specified in a request from the disease severity system), and/or a future interval (allowing the weather server to provide weather predictions, and thereby allowing the disease severity system to predict outbreaks and severity levels of future disease events).

At block 610, the disease severity system may adjust the canopy moisture budget. The canopy moisture budget may initially be set to zero, and for each iteration of the procedure shown in FIG. 6A, may be set to the value for the budget that existed in the previous predefined interval.

The canopy moisture budget may be adjusted for the addition of precipitation and dew, and the subtraction of leaf surface evaporation. The precipitation may be determined directly from the weather data provided at block 608. Dew formation is assumed to occur when the relative humidity (determined from the weather data) exceeds the predetermined humidity threshold (see FIG. 3). Leaf surface evaporation may be determined based on a relationship (defined in the relationships 304 of FIG. 3) between relative humidity, wind speed, and incoming solar radiation (each determined from the weather data).

At block 612, the disease severity system may determine a leaf wetness duration based on the canopy moisture budget. If, in a given hour (or other predefined time interval), the canopy moisture budget exceeds 0 mm, the plant leaves are assumed to be wet, adding one hour (or other corresponding predefined time interval) to the wetness duration. The duration may increase by one hour for each successive hour the budget is greater than 0 mm. The leaf wetness duration ends on the hour the canopy moisture budget falls to 0 mm.

At block 614, the system determines the average air temperature over the predefined interval. This information may be obtained directly from, or derived from, the weather data received at block 608. In some embodiments, the average air temperature over the predefined interval is computed as a running average over the wetness duration (e.g., for temperatures A, B, and C, corresponding to hours 1, 2, and 3, respectively, an average temperature at hour 2 can be computed as the average of A and B, and an average temperature at hour 3 can be computed as an average of A, B, and C). In some embodiments, disease events are assumed not to be possible if the temperatures are outside of a favorable range (see element 310 of FIG. 3). If the air temperature at block 614 is not favorable to the occurrence of a disease event, then processing may skip blocks 616-624 and proceed directly to block 626. If a disease event is ongoing at a time when the temperature rises or falls outside the favorable range, the ongoing disease event may be considered to terminate. If no disease event is ongoing and the temperature is outside the favorable range, a new disease event does not start regardless of how long the leaf canopy has been wet.

At block 616, the disease severity system may determine if the wetness duration determined in block 612 exceeds the minimum wetness threshold for a disease severity event to occur. The minimum wetness threshold may be defined based on a combination of a predefined relationship between temperature and minimum leaf wetness (see Equation 1 and element 304 of FIG. 3) and the constants that are specific to the organism and disease under consideration (see element 306 of FIG. 3).

If the determination at block 616 is "no," (i.e., the leaf wetness duration determined at block 612 does not exceed the minimum wetness threshold for a disease severity event), then no disease severity event is assumed to occur during the interval (and/or an ongoing disease severity event may end). It is noted, however, that although the wetness duration may not exceed the minimum wetness threshold for the current time interval, the wetness duration may continue to build over subsequent time intervals, and so a future interval may build on the wetness duration from the current interval in order to exceed the minimum wetness threshold. Processing may then proceed to block 626, and the system may determine if any further intervals remain to be considered.

On the other hand, if the determination at block 616 is "yes," (i.e., the leaf wetness duration exceeds the minimum wetness threshold, and the air temperature was previously determined to be favorable to disease), then a disease event is considered to start (or an ongoing disease event continues).

At block 618, the disease severity system computes the disease severity level for the disease event for the interval in question. The intensity of a disease severity event is generally defined by the length of the wetness duration period. It may also be affected by the average air temperature during the wetness period. For example, the disease severity level may be computed at each point in time over the wetness duration period based on the running average of the air temperature at a given point in time. A relationship (element 304 of FIG. 3) may define the specific relationship between wetness duration, temperature, and the disease severity level. This relationship may vary from organism to organism and disease to disease. The severity level may be normalized (e.g., on a percentage-based scale). For example, a severity level of 0% may indicate no infection, whereas a severity level of 100% indicates severe infection. In some embodiments, disease severities may be classified into bands or ranges (e.g., 0-10% indicates no infection, 10%-30% indicates a minor infection, 30%-60% indicates an intermediate infection, and 60%-100% indicates a severe infection).

In some embodiments, it may be helpful to determine the disease severity level for a given day, instead of considering only the disease severity level for each of the predefined intervals. Accordingly, a disease severity level for the day may be calculated in blocks 620. This particular embodiment sets the disease severity level for a given day to the level of the most-severe event for that day (if multiple disease severity events occur during that day), or the level of the single severity event for the day if only one severity event occurs during the day. The severity level may be initialized to 0% for a given day, so that if no disease event occurs, the disease severity level for the day remains at the minimum value.

If other techniques for determining the daily severity level are to be used (e.g., calculating the average severity among multiple severity events), then blocks 620-624 may be modified accordingly.

If the disease severity level is classified into bands or ranges, then the bands or ranges may be used in place of specific values at blocks 620-624.

At block 620, the system determines if the severity level calculated at block 618 exceeds the previous most-severe event for the day. If no disease event has occurred yet during the day under consideration, then the current most-severe event for the day is assumed to have the default severity level of 0%. If at least one disease event has occurred, then the current most-severe event level is the level of whatever the event having the highest disease severity is for the given day.

If the level of the current disease event does not exceed the level of the previous most-severe event for the day ("no" at block 620), then processing may proceed to block 624 and the disease severity system may maintain the existing daily severity level). If the level of the current disease event does exceed the level of the previous most-severe event for the day ("yes" at block 620), then processing may proceed to block 622 and the disease severity system may set the severity level of the current disease event is set to the daily severity level.

Processing may then proceed to block 626, where the system may determine if more intervals remain to be evaluated (for example, whether there are more intervals to calculate for the given day). If so, processing may return to block 606 and more weather data for a new interval may be retrieved. If not, processing may proceed to block 628 for further action by the agricultural system and/or the treatment system In some embodiments, the agricultural system and/or the treatment system may be provided with information about disease severity levels even while further processing is ongoing. For example, following block 626, processing may return to block 606 so that further weather data may be retrieved, and in parallel processing may proceed to block 628.

At block 628, the disease severity system may transmit the daily severity level, as determined at blocks 620-624, to the agricultural system. If the disease severity system services multiple agricultural systems, then a separate transmission may be made to each of the serviced agricultural systems.

At block 630, the agricultural system may determine whether the daily severity level received from the disease severity system exceeds a threshold severity. In some embodiments, the disease severity system may classify disease events into different tiers of severity, and the agricultural system may determine if the severity tier exceeds a tier threshold. The threshold severity (or tier threshold) may be set differently at different agricultural systems, based on many different factors (e.g., the user's tolerance for risk, the cost of treatments, the number of plants or amount of acreage to be treated, the availability of treatments, etc.).

If the determination at block 630 is "no," (i.e., the disease severity level does not exceed the daily threshold and therefore does not warrant treatment), then processing may proceed to block 634 and terminate.

If the determination at block 630 is "yes," (i.e., the disease severity level does exceed the daily threshold and therefore does warrant treatment), then processing may proceed to block 632. Here, the agricultural system may transmit an instruction to the treatment system, which may trigger the treatment system's control logic to apply the treatment. Processing may then proceed to block 634 and terminate.

In some embodiments (e.g., in addition to or alternatively to block 634), a computed disease severity level may be transmitted to one or more registered users with a recommended treatment action.

As a preferred embodiment of the present invention, the methods of the present invention further comprise a step to output a signal, such as a control signal or an on-off signal, for operating, controlling, and/or monitoring farming machinery, depending on the output comprising the disease severity level for the given day, especially if this output exceeds a certain predefined threshold value for the disease severity level. More preferably, in case the output comprising the disease severity level is related to a specific disease which can be controlled by a chemical or biological agent (such as a chemical or biological fungicide, insecticide, acaricide, nematicide, or molluscicide), a control or on-off signal for operating farming machinery in a way targeting this specific disease is outputted, for example, a control signal for operating farming machinery in order to apply or spray, or in order to prepare for applying or spraying a chemical or biological agent targeting this specific disease is outputted.

Farming machinery may include one or more treatment mechanisms to treat plants in a field. Treatment mechanisms include chemical, biological, mechanical, electrical treatment mechanisms, or a combination of such treatment mechanisms to treat diseases or insects. The farming machinery may further include a detection and a control system. The detection system may be configured to detect in field conditions as the farming machinery moves through the field. The control system may be configured to control treatment mechanism(s) based on the detected field conditions.

In one embodiment, the treatment mechanism is a chemical treatment mechanism. The farming machinery in such embodiment includes a sprayer with one or more nozzle(s) to release chemical agent to the field.

In another embodiment, the treatment mechanism is a biological treatment mechanism. The farming machinery in such embodiment includes a sprayer with one or more nozzle(s) to release biological agent to the field.

In one embodiment, the detection system comprises one or more detection component(s) to detect field conditions as the farming machinery traverses through the field. The detection component may be an apparatus claimed in the present invention, or may comprise an apparatus claimed in the present invention, or may be connected or operatively coupled to an apparatus claimed in the present invention.

Figure 6B:
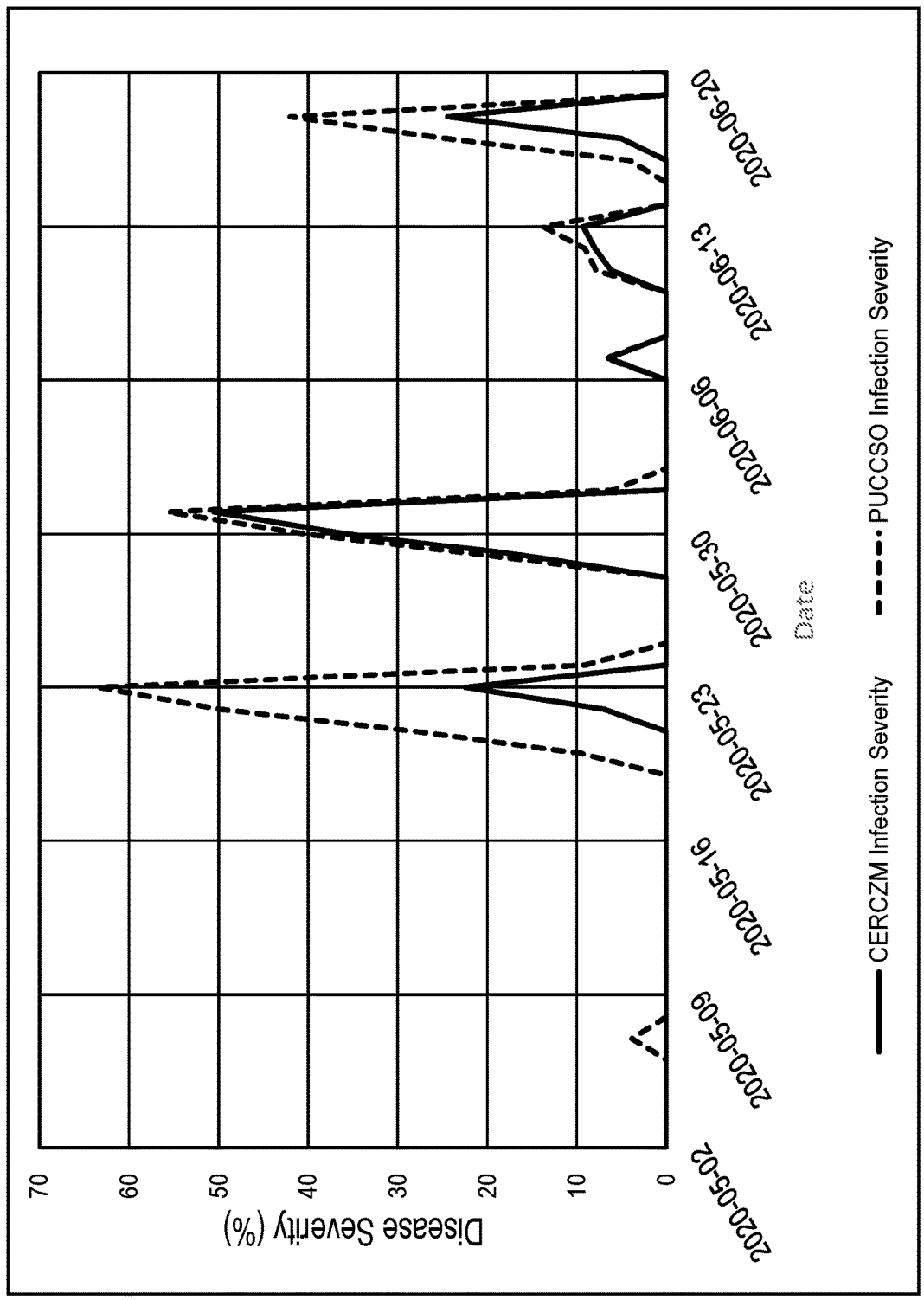
FIG. 6B is a plot of exemplary disease severity levels computed in accordance with one embodiment.

An illustrative example of an output of the steps of FIG. 6A is shown in FIG. 6B, which may be transmitted to one or more registered users. The plot of FIG. 6B corresponds to disease severity levels of grey leaf spot (*Cercospora zeae-maydis*, CERCZM) and common rust (*Puccinia sorghi*, PUCCSO) on corn as determined over a period from May 2, 2020, to Jun. 20, 2020, at a location in North Carolina.

Figure 7:
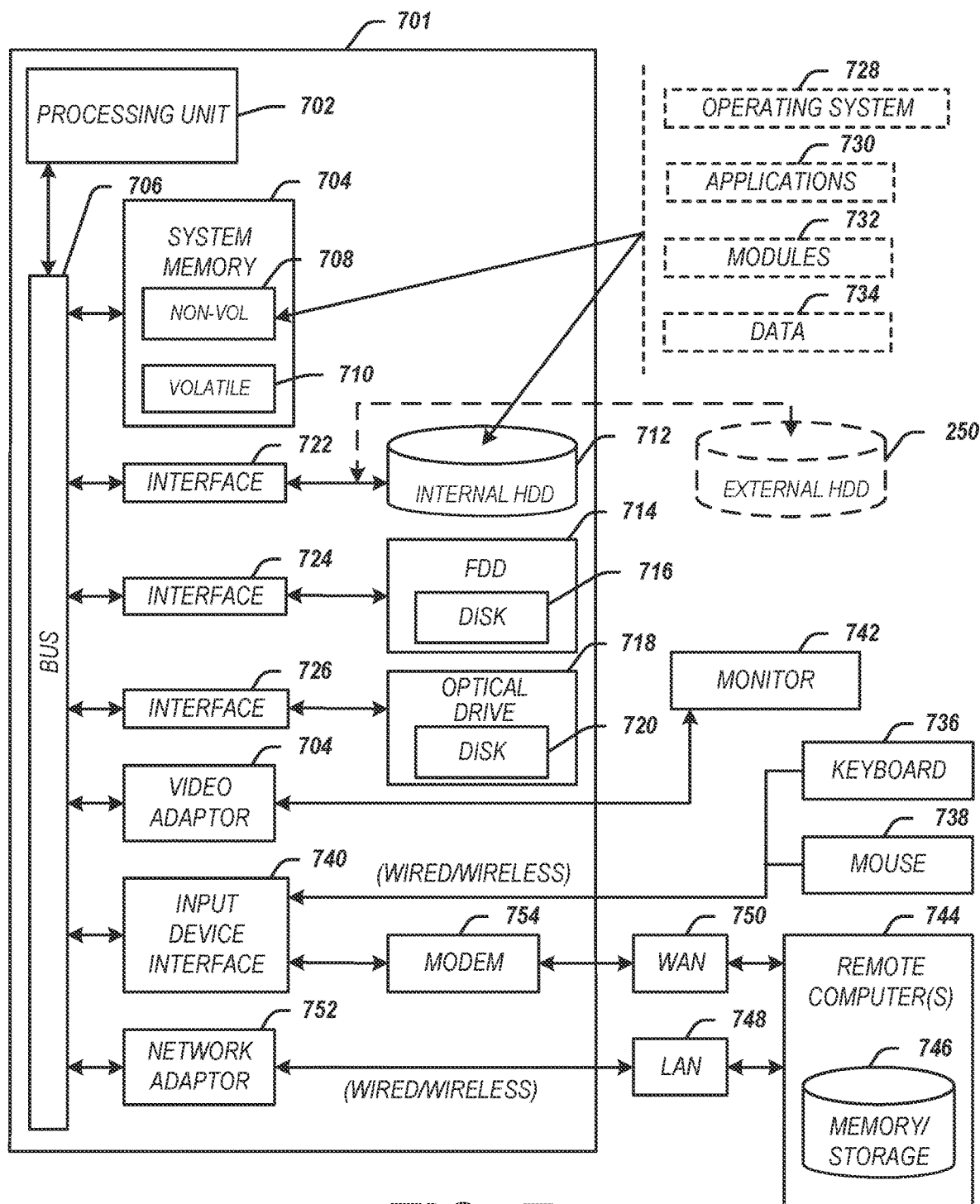
FIG. 7 depicts an exemplary computing system suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
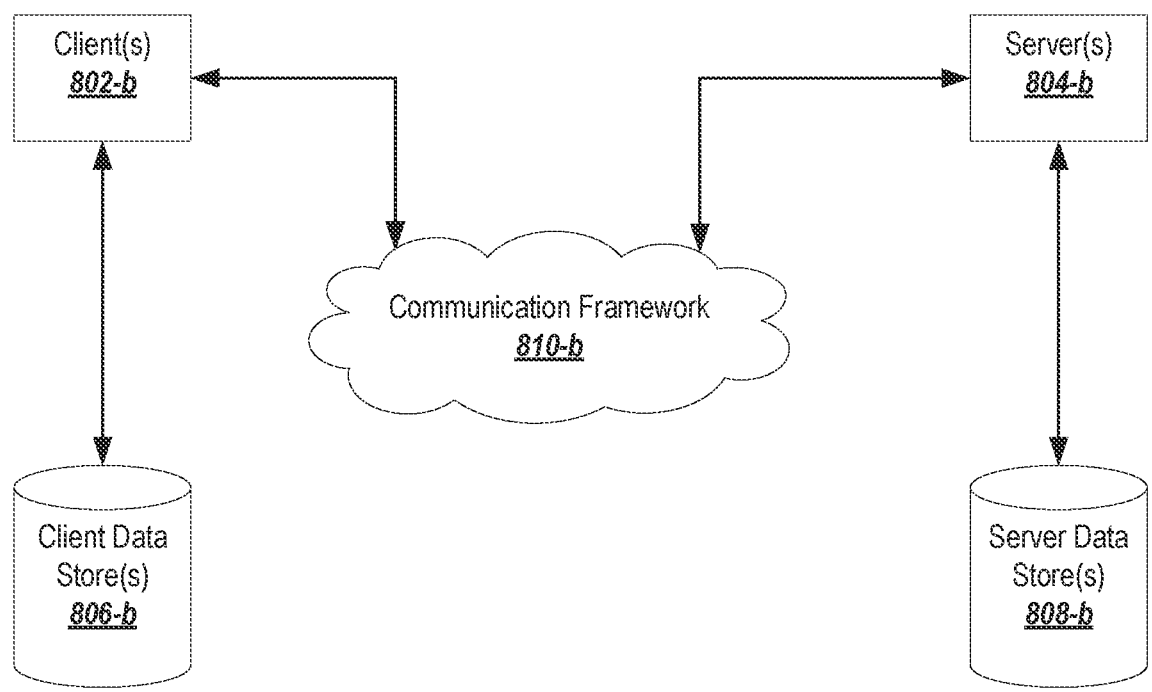
FIG. 8 depicts an exemplary network environment suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A non-transitory computer-readable medium storing instructions that, when executed by one or more processors of a computing device, cause the one or more processors to:
    receive, at the computing device, an input comprising weather data for a time period;
    conduct, using the computing device, a simulation using a disease severity model at predefined intervals for the time period, the simulation adjusting a canopy moisture budget for a plant at each of the predefined intervals;
    determine, using the computing device, a leaf wetness duration based on the canopy moisture budget, the leaf wetness duration representing a time interval during which leaves of the plant are assumed to be wet;
    determine, using the computing device, an average air temperature based on the leaf wetness duration;
    compute, using the computing device, a disease severity level based on the leaf wetness duration and the average air temperature;
    generate, at the computing device, an output comprising the disease severity level for the time period; and transmit, using the computing device, an instruction to a treatment system based at least partially on the disease severity level, wherein the treatment system is to utilize a treatment device that applies an amount of treatment to the plants.

2. The non-transitory computer-readable medium of claim 1, wherein the one or more processors store instructions to determine one or more of a precipitation amount, a dew amount, or a leaf surface evaporation amount, wherein the precipitation amount and the dew amount add to the canopy moisture budget and the leaf surface evaporation amount subtracts from the canopy moisture budget.

3. The non-transitory computer-readable medium of claim 2, wherein:
the weather data describes the precipitation amount, a relative humidity, a wind speed, and an amount of incoming solar radiation;
the dew amount is increased when the relative humidity exceeds a predetermined threshold; and
the leaf surface evaporation amount is a function of the relative humidity, the wind speed, and the incoming solar radiation.

4. The non-transitory computer-readable medium of claim 1, wherein the disease severity level is determined to increase when the average air temperature falls within a predetermined range during the leaf wetness duration.

5. The non-transitory computer-readable medium of claim 1, wherein computing the disease severity level comprises determining a minimum number of wetness hours for infection, determining whether the leaf wetness duration exceeds the minimum number of wetness hours, and determining the disease severity level based on the leaf wetness duration exceeding the minimum number of wetness hours at a favorable air temperature.

6. The non-transitory computer-readable medium of claim 1, wherein the disease severity level is defined by a length of the leaf wetness duration.

7. The non-transitory computer-readable medium of claim 1, wherein:
a single disease event occurs in the time period, and the disease severity level is set to a severity of the single disease event; or
a plurality of disease events having different severities occur in a given day, and the disease severity level is set to a severity of a most-severe event.

8. A method comprising:
receiving, at a computing device, an input comprising weather data for a time period;
conducting, using the computing device, a simulation using a disease severity model at predefined intervals for the time period, the simulation adjusting a canopy moisture budget for a plant at each of the predefined intervals;
determining, using the computing device, a leaf wetness duration based on the canopy moisture budget, the leaf wetness duration representing a time interval during which leaves of the plant are assumed to be wet;
determining, using the computing device, an average air temperature based on the leaf wetness duration;
computing, using the computing device, a disease severity level based on the leaf wetness duration and the average air temperature;
generating, at the computing device, an output comprising the disease severity level for the time period; and
transmitting, using the computing device, an instruction to a treatment system based at least partially on the disease severity level, wherein the treatment system is to utilize a treatment device that applies an amount of treatment to the plants.

9. The method of claim 8, further storing instructions for determining one or more of a precipitation amount, a dew amount, or a leaf surface evaporation amount, wherein the precipitation amount and the dew amount add to the canopy moisture budget and the leaf surface evaporation amount subtracts from the canopy moisture budget.

10. The method of claim 9, wherein:
the weather data describes the precipitation amount, a relative humidity, a wind speed, and an amount of incoming solar radiation;
the dew amount is increased when the relative humidity exceeds a predetermined threshold; and
the leaf surface evaporation amount is a function of the relative humidity, the wind speed, and the incoming solar radiation.

11. The method of claim 8, wherein the disease severity level is determined to increase when the average air temperature falls within a predetermined range during the leaf wetness duration.

12. The method of claim 8, wherein computing the disease severity level comprises determining a minimum number of wetness hours for infection, determining whether the leaf wetness duration exceeds the minimum number of wetness hours, and determining the disease severity level based on the leaf wetness duration exceeding the minimum number of wetness hours at a favorable air temperature.

13. The method of claim 8, wherein the disease severity level is defined by a length of the leaf wetness duration.

14. The method of claim 8, wherein:
a single disease event occurs in the given day, and the disease severity level is set to a severity of the single disease event; or
a plurality of disease events having different severities occur in the time period, and the disease severity level is set to a severity of a most-severe event.

15. An apparatus comprising:
a hardware interface configured to receive an input comprising weather data for a time period;
a non-transitory computer readable medium storing a disease severity model configured to conduct a simulation at predefined intervals for the time period, the simulation adjusting a canopy moisture budget for a plant at each of the predefined intervals;
a hardware processor configured to:
determine a leaf wetness duration based on the canopy moisture budget, the leaf wetness duration representing a time interval during which leaves of the plant are assumed to be wet;
determine an average air temperature based on the leaf wetness duration;
compute a disease severity level based on the leaf wetness duration and the average air temperature;
generate an output comprising the disease severity level for the time period; and
transmit an instruction to a treatment system based at least partially on the disease severity level, wherein the treatment system is to utilize a treatment device that applies an amount of treatment to the plants.

16. The apparatus of claim 15, wherein the non-transitory computer readable medium stores one or more of a precipitation amount, a dew amount, or a leaf surface evaporation amount, wherein the precipitation amount and the dew amount add to the canopy moisture budget and the leaf surface evaporation amount subtracts from the canopy moisture budget.

17. The apparatus of claim 16, wherein:
the weather data describes the precipitation amount, a relative humidity, a wind speed, and an amount of incoming solar radiation;
the dew amount is increased when the relative humidity exceeds a predetermined threshold; and
the leaf surface evaporation amount is a function of the relative humidity, the wind speed, and the incoming solar radiation.

18. The apparatus of claim 15, wherein the disease severity level is determined to increase when the average air temperature falls within a predetermined range during the leaf wetness duration, and the disease severity level is defined by a length of the leaf wetness duration.

19. The apparatus of claim 15, wherein computing the disease severity level comprises determining a minimum number of wetness hours for infection, determining whether the leaf wetness duration exceeds the minimum number of wetness hours, and determining the disease severity level based on the leaf wetness duration exceeding the minimum number of wetness hours at a favorable air temperature.

20. The apparatus of claim 15, wherein:
a single disease event occurs in the time period, and the disease severity level is set to a severity of the single disease event; or
a plurality of disease events having different severities occur in the time period, and the disease severity level is set to a severity of a most-severe event.

\* \* \* \* \*